Dec. 13, 1927.  1,652,241

M. C. HALL

DEVICE FOR ELECTRICAL MEASUREMENT

Filed June 21, 1926

INVENTOR
M. C. Hall
BY
ATTORNEY

Patented Dec. 13, 1927.

1,652,241

UNITED STATES PATENT OFFICE.

MERTON C. HALL, OF CHARLOTTE, NORTH CAROLINA, ASSIGNOR TO AMERICAN TELEPHONE AND TELEGRAPH COMPANY, A CORPORATION OF NEW YORK.

DEVICE FOR ELECTRICAL MEASUREMENT.

Application filed June 21, 1926. Serial No. 117,545.

This invention relates to methods of and means for making measurements required in connection with the construction and operation of electric circuits, and more particularly to methods of and means for measuring the inductance and effective resistance of coils included in circuits carrying alternating currents of telegraph frequencies.

The object of my invention is the comparatively simple and ready determination, with a close approach to accuracy, of the inductance and effective resistance of coils at telegraph frequencies, with or without a simultaneous direct current flow through the coils.

I employ a bridge circuit and provide arrangements of the circuit elements and methods of measurement suitable to the accomplishment of my purpose.

In the ordinary bridge methods of making measurements, with a flow of alternating current and a simultaneous flow of direct current, a large condenser is usually connected in series with the inductometer. The use of such a condenser is satisfactory when the alternating currents are of telephone frequencies. At such frequencies the condenser serves to exclude the direct current from the balancing branch of the bridge and is of negligible impedance. At telegraph frequencies, however, the impedance of a condenser, even one of large capacity, may be quite great. Furthermore, if the usual bridge system is used for measurements at telegraph frequencies with a simultaneous direct current flow, there is difficulty in providing for an efficient separation of the two power circuits and also difficulty in obtaining a satisfactory indication of the balanced or unbalanced condition of the bridge.

Figure 1:
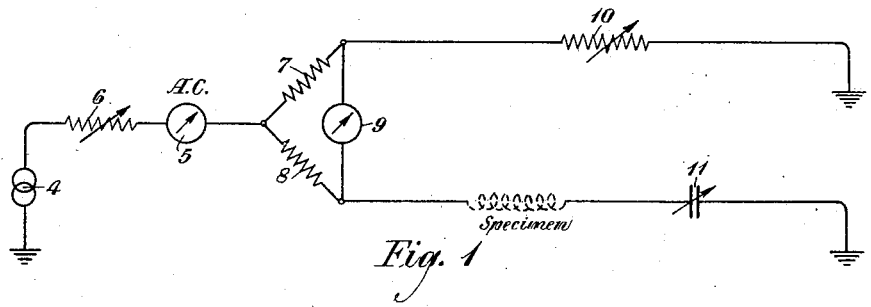
Figure 2:
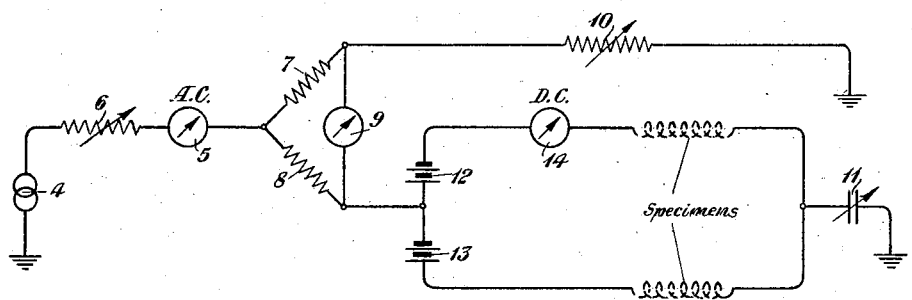
Figure 3:
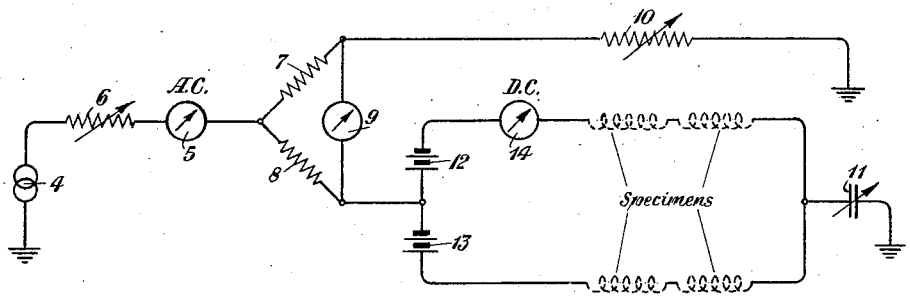

I employ a bridge system having two adjacent arms formed of fixed and equal resistances. I place the specimen in one of the other arms of the bridge in series with a variable capacity. The fourth arm of the bridge I form of a variable resistance. My arrangement and my methods of measurement will be clearly understood when the following description of the circuit and the methods involved is read with reference to the accompanying drawing. Figure 1 of the drawing shows diagrammatically the circuit which I employ when the effect of the alternating current flow alone is to be determined. Figs. 2 and 3 of the drawing show modified forms of the bridge circuit which are employed when it is desired to measure the effect of a simultaneous direct current superimposed upon the alternating current. Like numerals of reference in the several figures of the drawing designate like elements of the circuits.

For the measurement of the inductance and the effective resistance of a coil at a given frequency within the range of the so-called "telegraph" frequencies, without a direct current flow through the coil, I form an electric bridge with two adjacent arms consisting of the fixed and equal resistances 7 and 8, preferably non-inductive. I place the specimen to be measured in a third arm of the bridge in series with the variable condenser 11, and form the fourth arm of the variable resistance 10. An alternating voltage is applied to the bridge from the source 4, which is connected to the bridge through the variable resistance 6 and the alternating current meter 5. A suitable galvanometer 9 is connected across the bridge, as shown. When the alternating electromotive force is applied to the bridge, the frequency is fixed at the desired value. Resonance is produced by adjusting the capacity of the variable condenser 11 to the unknown inductance of the specimen, and the effective resistance of the specimen is balanced by the adjustment of the resistance 10. The balanced or unbalanced condition of the bridge is of course indicated in the galvanometer 9. It will be readily understood that when a balance of the bridge is effected the currents through the two branches are equal and in phase and the voltage drops through the resistances 7 and 8 are equal. The effective resistance of the specimen coil is readily determined, once the above described condition of the circuit is obtained, from the resistance 10 necessary to balance the bridge. The unknown inductance is determined as follows: It is well known in the art that in a circuit having an inductance, a capacity, and a resistance in series, the condition of resonance may be expressed by the equation, $$\omega L = \frac{1}{\omega C},$$

where $\omega$ is equal to $2\pi$ times the frequency, L represents the inductance in henries, and C represents the capacity in farads; or an equivalent expression is $$L = \frac{1}{\omega^2 C}$$

Now, since a given frequency is impressed on the bridge, and since resonance is obtained in the circuit by the adjustment of the variable condenser 11, we may substitute in the fundamental resonance equation given above the known values of $\omega$ and C, readily determining the unknown quantity L—or the inductance of the specimen.

If it is desired to measure the inductance and the effective resistance of a given coil at a telegraph frequency, but with a simultaneous flow of direct current through the coil, my circuit should be modified as shown in Fig. 2. Two like specimens are used, one connected in series with the battery 12 in one of two parallel paths, and the other in series with the battery 13 in the other parallel path, the batteries being so connected in the circuit that they will aid each other through the specimens. A direct current meter 14 is included, as shown in the drawing. It will be seen that the direct current has only one path, which is through the specimens and the meter 14. As in the case of Fig. 1, resonance is produced by the adjustment of the variable condenser 11, and the effective resistance of the arm of the bridge including the specimens is balanced by the proper adjustment of the resistance 10. It will be readily understood that, since we have in this case two specimens connected in parallel, it will be necessary to double the results determined as explained above, in order to obtain figures corresponding to a single specimen.

In certain special cases in which the parallel inductance of the two specimens is of such value as to require a very high capacity for resonance, it will be necessary to use four like specimens, connecting two specimens in each of the parallel branches, as shown in Fig. 3. In this case, of course, the observations and the computed result will be the true values of the effective resistance and the inductance of each of the specimens, since the series connection of two specimens doubles the value which would be had with one specimen, and the parallel branch with like series connection reduces the doubled value by one half.

The meter 9 is preferably a vibratory galvanometer in which the magnitude of the deflection at telegraph frequencies may be readily observed.

It has been found that by means of the simple measuring circuit described above the inductance of a coil may be determined with an error of not more than two per cent, and the effective resistance within about three per cent.

While specific circuit arrangements are shown and described for the purpose of illustration, it is to be understood that changes from the described forms may be made without a departure from the spirit and true scope of my invention as defined by the appended claims.

What is claimed is:

1. The method of measuring the inductance and the effective resistance of a coil conducting alternating current and direct current simultaneously, by means of a bridge having two arms formed of fixed and equal resistances, which consists in introducing specimens of the coil connected in parallel into the third arm of the bridge, applying to the bridge an alternating electromotive force of known frequency, passing a direct current of known value through the specimens, introducing into said third arm in series with the specimens sufficient capacity to produce resonance, introducing into the fourth arm of the bridge sufficient resistance to balance the bridge, determining the unknown inductance by substituting the determined resonating capacity in the fundamental resonance equation, and determining the unknown effective resistance from the determined balancing resistance.

2. The method of measuring the inductance and effective resistance of a coil conducting alternating current and direct current simultaneously, by means of a bridge having two arms formed of fixed and equal resistances, which consists in introducing specimens of the coil connected in parallel into the third arm of the bridge, applying to the bridge an alternating electromotive force of a known frequency, passing a direct current of known value through the specimens, determining the series capacity required to produce resonance, determining the resistance required in the fourth arm to balance the bridge, determining the unknown inductance by substituting the determined resonating capacity in the fundamental resonance equation, and determining the unknown effective resistance from the determined balancing resistance.

3. The method of measuring the inductance and the effective resistance of a coil conducting alternating current and direct current simultaneously, by means of a bridge having two arms formed of fixed and equal resistances, which consists in introducing specimens of the coil connected in parallel into the third arm of the bridge, introducing a variable capacity in series with said specimens, introducing a variable resistance into the fourth arm of the bridge, applying to the bridge alternating electromotive force of a known frequency, passing a direct current of known value through said specimens, producing resonance by adjusting the capacity, balancing the bridge by adjusting the resistance in the fourth arm, determining the unknown inductance by substituting the determined resonanting capacity in the fundamental resonance equation, and determining the unknown effective resistance from the determined balancing resistance in the fourth arm.

4. An electric bridge system for measuring the inductance and the effective resistance of a coil conducting alternating current and direct current simultaneously, comprising two fixed and equal resistances forming two adjacent arms of the bridge; a variable resistance forming the third arm of the bridge; a fourth arm of the bridge including a variable capacity, specimens of the coil connected in parallel, and means for passing through the specimens a direct current of a given value; means for applying to the bridge alternating electromotive force of a given frequency; and means for indicating the balanced or unbalanced condition of the bridge.

In testimony whereof, I have signed my name to this specification this 17th day of June, 1926.

MERTON C. HALL.